United States Patent [19]

Doutsubo

[11] Patent Number: 4,618,899
[45] Date of Patent: Oct. 21, 1986

[54] RECORD MODE DISCRIMINATION CIRCUIT

[75] Inventor: Nobuhide Doutsubo, Daitō, Japan

[73] Assignee: Sanyo Electric Co., Ltd., Moriguchi, Japan

[21] Appl. No.: 746,413

[22] Filed: Jun. 19, 1985

[30] Foreign Application Priority Data

Jun. 20, 1984 [JP] Japan ............................... 59-126920
Oct. 12, 1984 [JP] Japan ............................... 59-214952

[51] Int. Cl.$^4$ ............................................ G11B 15/52
[52] U.S. Cl. ................................................ 360/73
[58] Field of Search ........................................ 360/73

[56] References Cited

U.S. PATENT DOCUMENTS 4,490,755 12/1984 Tokuyama ............................ 360/73
4,550,345 10/1985 Terada et al. ........................ 360/73

Primary Examiner—George G. Stellar
Attorney, Agent, or Firm—Armstrong, Nikaido, Marmelstein & Kubovcik

[57] ABSTRACT

The present invention is directed to a record mode discrimination circuit for use in a 8 mm video, which is adapted to sample tracking error signals at a field period to input the sample hold out into a hysteresis comparator, and provided with a duty identification circuit wherein, in the case of that the variation component of 15 Hz is produced in the tracking error component, if the duty cycle is out of approximate 50, the switching operation of the reproduction mode is rendered to prohibit on the assumption of existing the unnecessary component of 15 Hz.

3 Claims, 14 Drawing Figures

RECORD MODE DISCRIMINATION CIRCUIT

BACKGROUND OF THE INVENTION

1. Field of the Invention

The present invention relates to a record mode discriminating circuit which is adopted in 8 mm video for recording operations in two modes, a standard mode and a long time mode.

2. Description of the Prior Art

Generally, the 8 mm video records pilot signals for tracking use on FM picture signals without formation of control tracks. At the reproduction, tracking error signals are formed according to the level ratio of the particular two beat components of an injunction pilot signal and a reproduction pilot signal. At the reproduction, normally the tracking error signal is fed to a capstan servo to cause the tape to run at a constant speed which is the same as that at the recording.

On the other hand, this 8 mm video has a standard record mode and a double long-time record mode. When the tape recorded in the standard record mode is reproduced in the long time mode, the tracking error signal changes at an 8 field period, when the tape recorded in the long time reproduction mode is reproduced in the standard reproduction mode by mistake, the tracking error signal varies at a 4 field period. A record speed discrimination circuit of a tape for use in this 8 mm video is disclosed in U.S. patent application Ser. No. 699,628, filed on Feb. 8, 1985 in the name of Sachio Yamashita and assigned to the same assignee, SANYO ELECTRIC CO., LTD.

When the period of the tracking error signal is counted, the tracking errror signal is desired to be rectangular in wave. Thus, although the waveform is desired to be shaped, with the threshold level as a border, by a comparator, it becomes difficult to set the threshold level because of the large variation in the tracking error level through variation in the reproduction output level, and furthermore, it becomes difficult to shape the correct waveforms because of production of a plurality of cross points, which are to be primarily one in number, between the threshold level and the tracking error signals when the rectilinearity of the record track is wrong.

Also, when the reproduction characteristics of the video head are taken into consideration, the reproduction level of the signal to be provided through the direct scanning operation of the track by the head gap has a characteristic of 6 dB/oct to be reproduction signal frequency and the reproduction pilot signal level becomes directly proportional to the reproduction pilot signal frequency. The reproduction level of a signal to be reproduced by the track disengaged from the head gap depends upon the signal frequency. Accordingly, even if the ideal record track is ideally scanned, the tracking error signal does not become 0 and vriation which has a given periodicity is assumed in dependence on the reproduction pilot signal frequency.

Furthermore, in the production of the actual 8 mm video, the head gap width is disengaged from the original value because of the inferior yield in the head production. Also, the mounting stage difference may be caused even in the head mounting operation. The tracking error signal varies even in accordance with the variation in such a manufacturing process, with the result that the head comes to scan the video track so that the average value of the tracking error signal becomes 0.

Hereinafter, variations in the tracking error signal will be examined through the variations in head gap width, head gap width, the various changes in head mounting stage difference or the like. FIG. 7 shows the tracking error signal waveforms of 4 field portions in a case where the record track in an ideal standard mode of 20.5 $\mu$m in track pitch is reproduced in a standard mode. A first stage of signal waveform shows the tracking error signal form in a case where the pair of head gaps width is 24 $\mu$m, second, third stages of signal waveforms show the tracking error signal waveforms when the pair of head gaps width which should be originally 24 $\mu$m has become irregular to 23 $\mu$m, 25 $\mu$m, also furthermore, fourth, fifth stages of signal waveforms show the tracking error signal waveforms when the pair of head gaps width has been spread to 28 $\mu$m, 38 $\mu$m. In addition, the tracking error signal waveform of each stage is one when a second row has a stage difference of 1 $\mu$m, a third row has a stage difference of 2 $\mu$m in a case where a first row has no stage difference. It is to be noted that the tracking error signal waveform may be obtained by a known operation equation.

As apparent from this diagram, the tracking error signal waveform of 15 Hz is assumed when the head gaps is inferior, when the head has mounting stage difference. However, if such unnecessary variation of 15 Hz is caused in the tracking error signal when the record pattern of the standard mode is reproduced correctly in the standard mode, a discrimination error is caused as if a record mode discrimination circuit scanned the record track of a long time mode. Although it seems better to improve a discrimination circuit so that a discrimination output may be transmitted only when the tracking error signal changes in 15 Hz largely beyond the threshold level so as to prevent the discrimination error, it is difficult in fact to specify the threshold level, because the reproduction output level changes by about 10 dB because of the characteristics of the record medium and the record reproduction characteristics so that the variations width of the tracking error signal may change in accordance with the reproduction output level.

SUMMARY OF THE INVENTION

Therefore, the present invention provides a tracking error signal waveform shapihg circuit which is adapted to stably and positively shape the waveform independently of the rectilinearity of the record track so as to eliminate the above-described defect.

Also, the present invention is to provide a record mode discrimination circuit for tracking error signals which is capable of stably and positively shape the waveform independently of the variations in head gap width, the head mounting stage difference, etc.

Accordingly, in the circuit of the present invention, the tracking error signals are sampled at a field period to input the sample hold output into a hysteresis comparator.

Also, the present invention is adapted to eliminate the error action of the record mode discrimination circuit through identification of the waveforms with a view to considering that the tracking error signal waveform when the record track of the long time mode has been reproduced is symmetrical in waveform, unnecessary component of 15 Hz to be caused in the tracking error signal because of the above-described reason is nonsymmetrical in wave. Therefore, the present invention is characterized in that the tracking error signals are inputted into a comparator, the period of the comparator output is identified and the duty cycle of the comparator output is identified to identify the reproduction of the record track of the long time mode during the standard mode reproduction in accordance with both identification outputs.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

Figure 1:
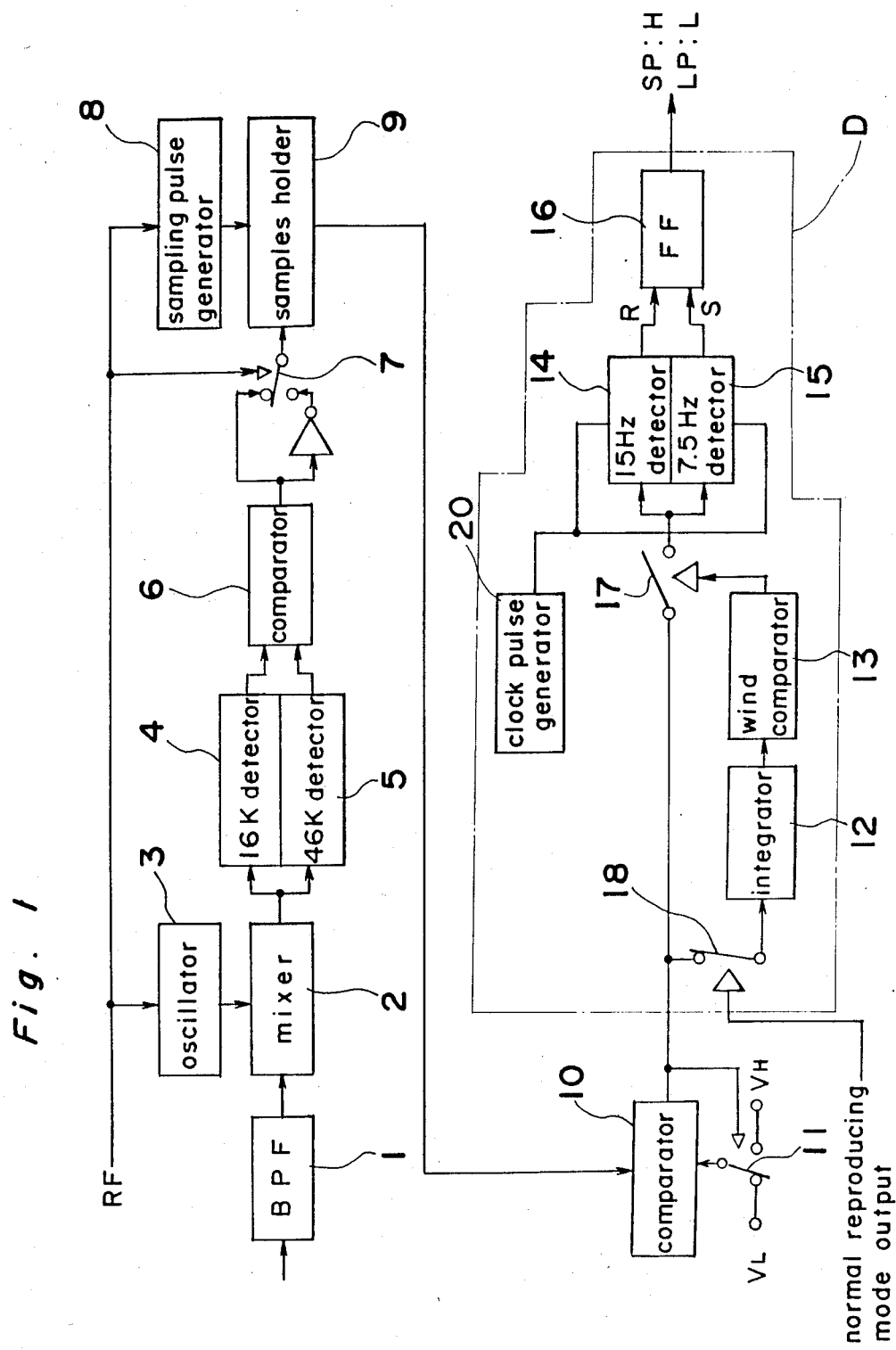
FIG. 1 is a circuit block diagram in accordance with a first embodiment of the present invention.

The present invention will be described hereinafter with reference to one embodiment adopted in a record mode discriminating circuit which is adapted to discriminate between the tape recorded in a standard mode and the tape recorded in a double long time mode so as to normally render the reproduction possible to be performed. FIG. 1 shows a circuit block diagram of a first embodiment of the present invention.

First, a reproduction pilot signal to be inputted into a mixer (2) through a band-pass filter (1) is mixed with an injection pilot signal. The injection pilot signal is introduced out of an injection oscillation circuit (3) which includes a 2 bits counter being inputted with the head output changeover pulse (RF) as a counter input and is adapted to sequentially switch the oscillation frequency to four values like as in recording in response to the counter output. The 16 KHz component and 46 KHz component among the beat components to be obtained from the mixer (2) are inputted respectively into a 16 K detection circuit (4) and a 46 K detection circuit (5) so that both detection outputs may be inputted into a comparison circuit (6). Comparison outputs is a kind of discontinuous wave which is reversed in polarity for each of the fields. Thus, a switching circuit (7) with head output change-over pulses (RF) as control inputs introduces the continuous tracking error signals by the alternate selection of the comparison output and its reversion output.

Figure 3:
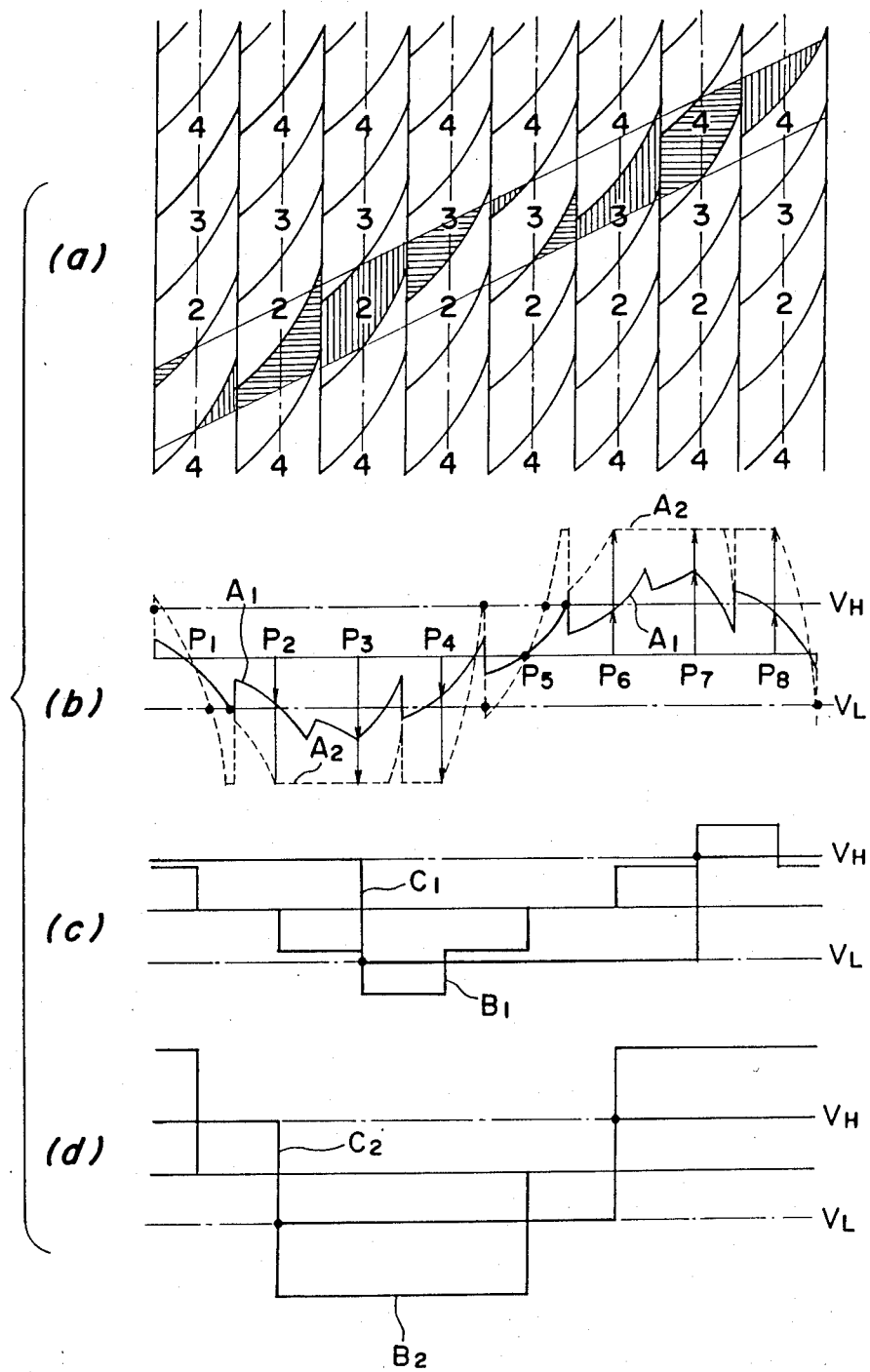
FIG. 3(a) is a scanning track illustration view of a track pattern which is inferior in rectilinearity.
FIGS. 3(b) and 3(c) and 3(d) are illustrating view for the tracking error signal waveforms in the scanning track of FIG. 3(a), and the shaping waveforms.

The tracking error signal becomes such waveforms as illustrated in FIG. 3, $A_1$, $A_2$ when the rectilinearity of the record track is inferior. In a first embodiment, these tracking error signals are sampled at the center of the scanning operation. Accordingly, a sampling pulse generating circuit (8) produces as sampling pulses the pulses which have been delayed by 1/120 seconds in the rising and falling of the head output change-over pulses. The same hold circuit (9) sample-holds the tracking error signals in exactly the center (namely, corresponding to the center of the picture) of the scanning. The points ($P_1$) through ($P_8$) in FIG. 3 show the sampling points with respect to the waveforms $A_1$, $A_2$.

This sample hold outputs become waveforms shown by $B_1$, $B_2$ in FIG. 3 and sudden amplitude variation is removed. The sample hold outputs are considered the comparison-side inputs of a comparator (10) composed of a hysteresis comparator. A positive-side threshold voltage ($V_H$) and a negative-side threshold voltage ($V_L$) are selectively inputted, by an inversion switch (11), as the reference inputs of the comparator (10). The inversion switch (11) is adapted to select the negative-side threshold voltage ($V_L$) when the comparator output is high at level, and it is adapted to select the positive-side threshold voltage ($V_H$) when the comparator output is low at level.

Thus, the comparator output stably changes at a given period. This comparator output is counted at its period, by a clock pulse, in a discrimination circuit (D) and introduces the discrimination output for discriminating the record mode.

Although this discrimination output is used for switching the revolution speed of the capstan motor, the description of this switching operation will be omitted, because the switching operation is known in the art in the conventional ½ inch cassette type VTR.

The construction of the discrimination circuit (D) will be described hereinafter in detail.

Generally, the unnecessary component of 15 Hz of the tracking error signal becomes 25% or 75% in duty cycle because of asymmetry of the signal waveform.

Also, the tracking error signal waveform when the record pattern of the standard reproduction mode is reproduced at a long time mode becomes also 50% in the duty cycle of the hysteresis comparator output because of the symmetry. Therefore, in a first embodiment, the period is discriminated only when the duty cycle is 50%.

FIG. 1 shows a circuit block diagram in the embodiment. In the present embodiment, at first the tracking error signal is inputted to a hysteresis comparator (10), which is adapted to switch two-value threshold levels in accordance with the output condition, to shape the waveform. An integration circuit (12) which inputs this comparator output generates the integration output in accordance with the duty cycle. The wind comparator (13), which inputs this integration output, transmits the output of the high level when the duty cycle of the integration output level is at the output level corresponding to 40 through 60%. An analog switch (17), to be closed in circuit by the high level output, inputs the hysteresis comparator output into a 15 Hz detection circuit (14) and a 7.5 Hz detection circuit (15). Both the detection circuits produce output in the period of the hysteresis comparator output when the period coincides with the detection period by counting operation of the output of a clock pulse generating circuit (20). Both the detection outputs are inputted into the reset terminal and the set terminal of a next-stage flip-flop (16). The flip-flop output reproduces the record pattern of a standard becomes high in level, while it reproduces the record pattern of a long time mode and become low in level, so that it is introduced as mode decision output. It is to be noted that an analog switch (18) in the drawing normally feeds the hysteresis comparator output to the integration circuit (12) only at the normal reproduction mode to prohibit the mode discrimination during the special reproduction.

In a first embodiment, the integration circuit (12) and the wind comparator (13) corresponds to a duty identification circuit, a 15 Hz detection circuit (14) and a 7.5 Hz detection circuit (15) correspond to a period identification circuit, an analog switch (17) and a flip-flop (16) correspond to a discrimination output generating circuit.

Figure 2:
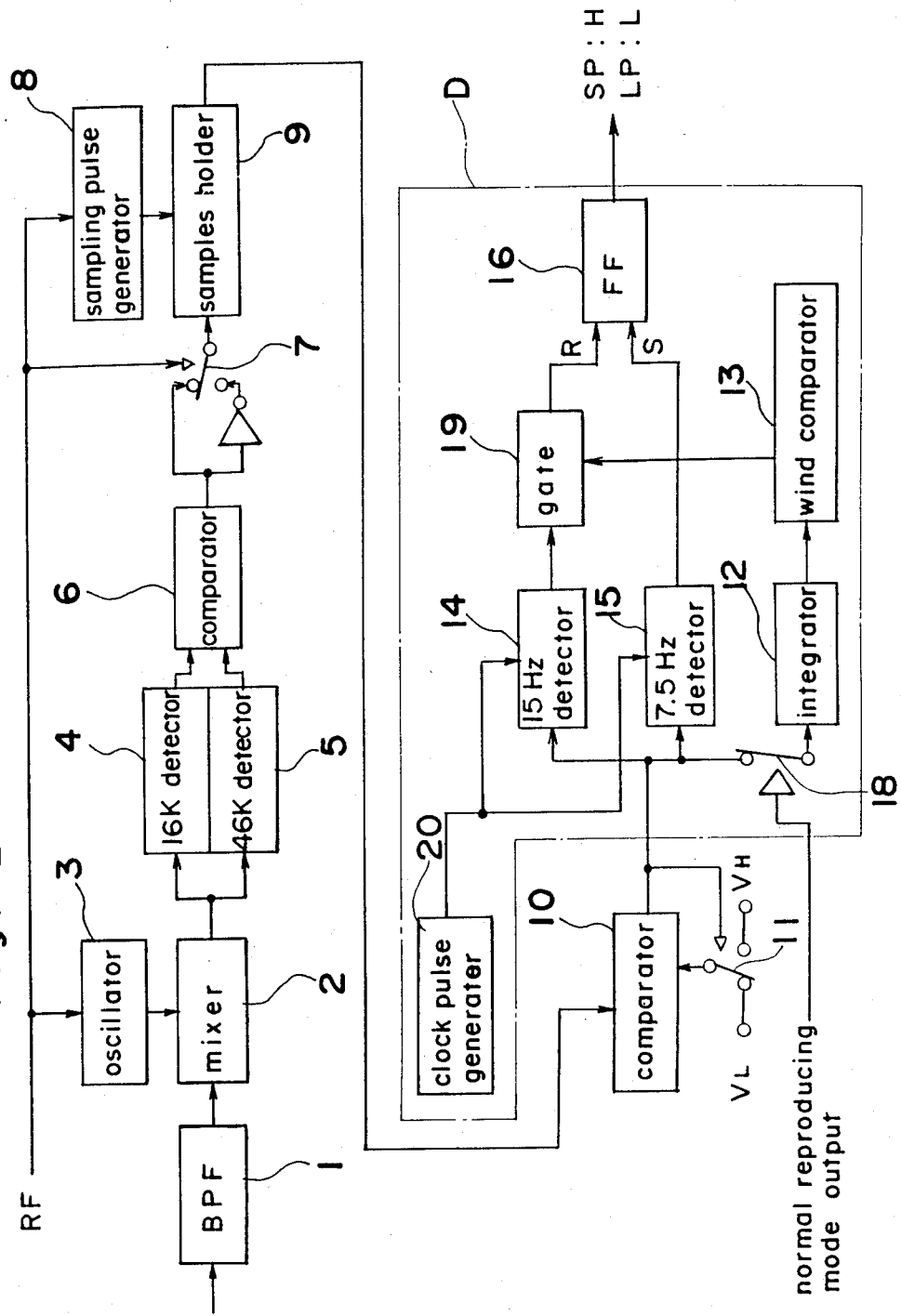
FIG. 2 is a circuit block diagram in a second embodiment of the present invention.

Then, in a second embodiment shown in FIG. 2, the hysteresis comparator output inputs simultaneously a duty identification circuit and a period identification circuit so that the output of the period identification circuit may be controlled by the output of the duty identification circuit.

Thus, in a second embodiment, a gate (19) where the 15 Hz detection output is rendered a signal input is disposed at a front stage of the flip-flop (16) so that the output of the wind comparator (13) may become a control input of the gate (19). Accordingly, the 15 Hz detection output is introduced only when the duty cycle is 50%.

Also, furthermore when the mode of the record pattern and the reproduction mode have disagreed, an FG signal which is a rotation detection signal of the capstan motor is put into a given relation with the tracking error period. Namely, a counted value in a case where 7.5 Hz in a long time reproduction mode had been counted by an FG signal is equal to a case where 15 Hz has been counted by an FG signal in a standard reproduction mode. Thus, the detection circuits (14), (15) in the first, second examples may be rendered common if the FG signal, not a fixed clock, is inputted. Namely, in the detection circuits (14), (15), the period of the hysteresis comparator output is counted by the FG signal. The detection output reverses a T-type flip-flop (16) through the gate circuit (19).

The operation and effect of a record mode discrimination circuit composed of such construction as described hereinabove will be described hereinafter in the various waveforms.

First, the tracking error output when the record track which is inferior in rectilinearity is scanned in an illustrated direction as shown in FIG. 3 becomes waveforms shown in the $A_1$, $A_2$ of FIG. 3. It is to be noted that the waveforms $A_2$ shown in a broken line are ones in a case where the reproduction output level is larger than the waveforms $A_1$ as shown in a solid line. When these waveforms are inputted into a hysteresis comparator which is adapted to switch, in accordance with the output condition, the threshold levels ($V_H$), ($V_L$) of the positive, negative two values, the comparator output waveforms becomes like $C_1$, $C_2$.

Since the present invention samples the tracking error signal at a field period to input the sample hold output into a hysteresis comparator, there are no problems when the waveform A is inputted. Also, even when the waveform B is inputted, the waveform is adapted to be correctly shaped. Accordingly, the tracking error signal is sampled in the longitudinal direction of the record tape even if the rectilinearity of the record track becomes inferior, thus allowing the positive waveforms to be shaped, whereby the larger effect is provided.

Then, a case is provided where the rectilinearity of the record track is superior.

Figure 4:
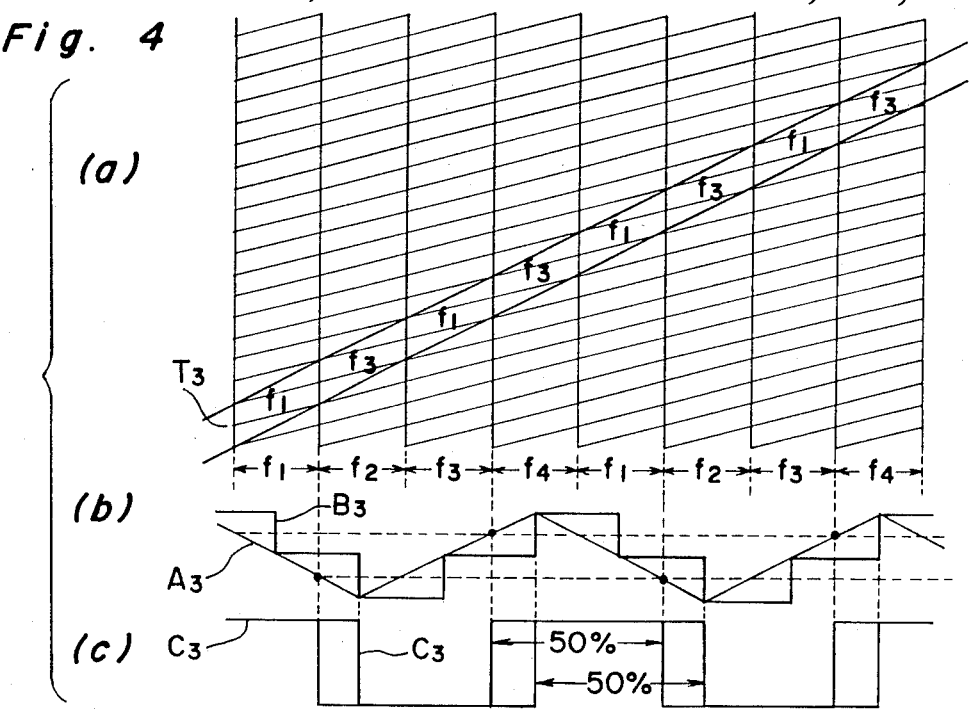
FIGS. 4(a) through 4(c) are illustrating views for the scanning track, the signal waveform and the shaping waveform in a case where the record pattern of a long time mode is reproduced in a standard mode.

FIG. 4 shows the scanning track, the tracking error signal waveform, sample hold output ($B_3$) and the hysteresis comparator output waveform in a case where a record track pattern recorded in a long time mode is reproduced in a standard mode. The tracking error signal waveform ($A_3$) is changed-over to the sample hold output ($B_3$) by the sample hold circuit. As apparent from the drawing, the waveform ($A_3$) of the tracking error signal when the record pattern of the long time mode is reproducingly scanned as illustrated in the ($T_3$) becomes symmetrical in the signal waveform. When the sample hold output ($B_3$) is inputted into the hysteresis comparator, the waveform ($C_3$) of the comparator output becomes 50% in duty cycle because of the symmetry of the input signal.

Figure 5:
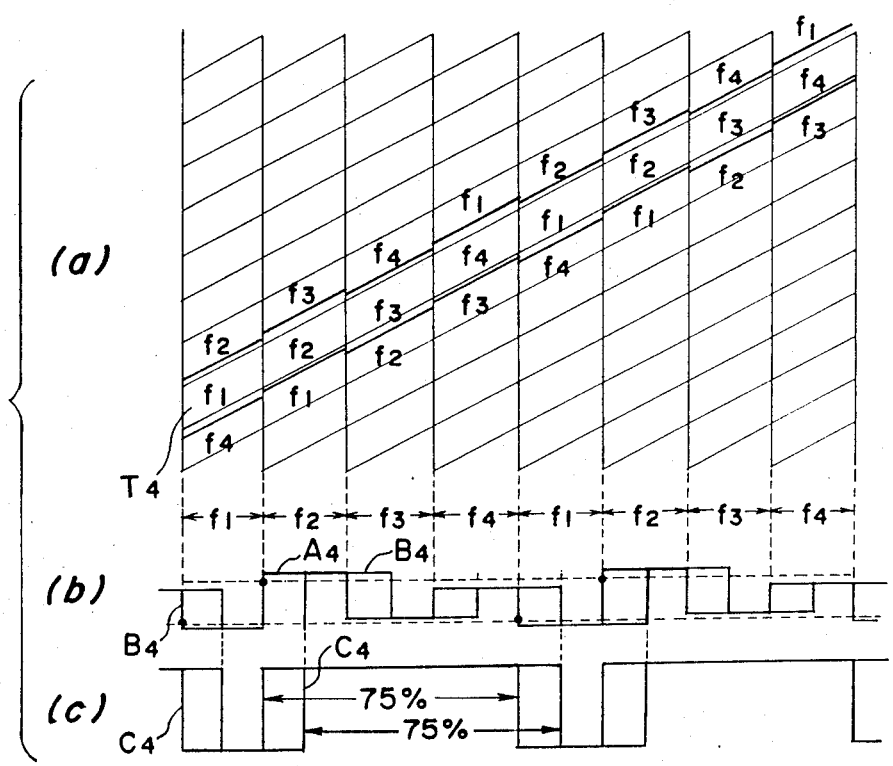
FIGS. 5(a) through 5(c) are illustrating views for the scanning track when the record pattern of the standard mode has been reproduced in 8 mm video mounting stage differences in the head, for the signal waveform and the shaping waveform.
Figure 6:
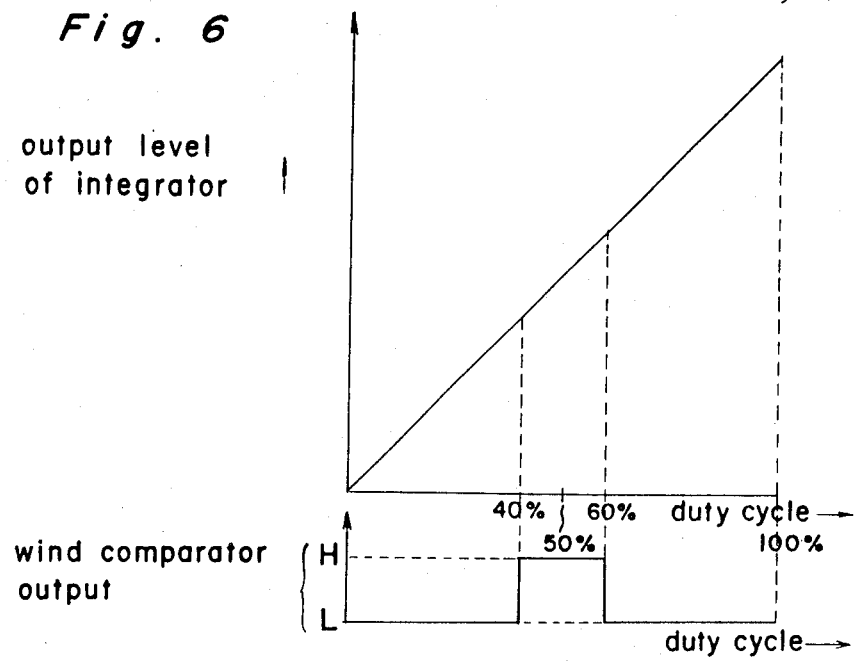
FIG. 6 shows relation diagrams for the respective outputs of an integration circuit, a wind comparator, and the duty cycle.
Figure 7:
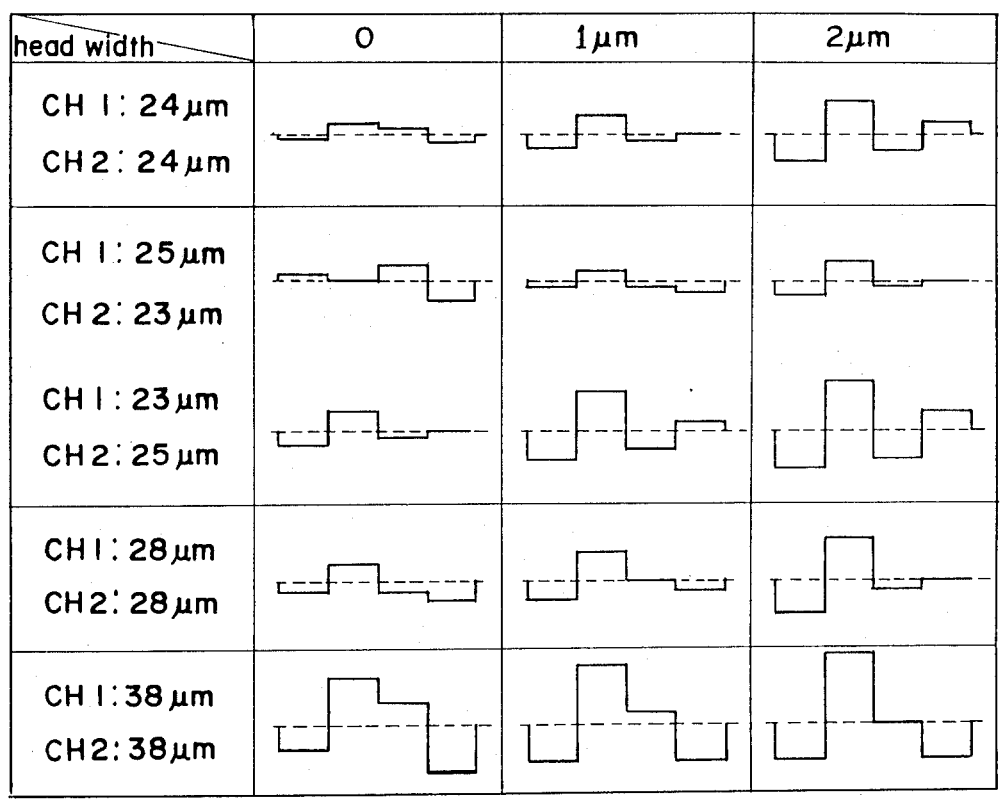
FIG. 7 is a waveform illustration view for tracking error signals in accordance with the production error.

Then, FIG. 5 shows a scanning track, a tracking error signal waveform $A_4$, sample hold output $B_4$ and a hysteresis comparator output waveform in a case where an ideal track pattern recorded in a reference mode, an 8 mm video which has the headgear width of 24 μm with the mounting stage difference of 2 μm are recorded in a standard mode. The tracking error signal waveform ($A_4$) is changed-over to the sample hold output ($B_4$) by the smaple hold circuit. As apparent from the drawing, when such scanning track ($T_4$) as shown in the 8 mm video is reproduced, the waveform ($A_4$) of the tracking error signal becomes irregular in the waveform as shown and the duty cycle of the waveform ($C_4$) of the hysteresis comparator becomes 75% because of the non-symmetry. Therefore, in the present invention, in a case where a duty identification circuit which detects the duty cycle does not detect the duty of 50% when the variation component of 15 Hz is produced in the tracking error component, the unnecessary component of 15 Hz is considered to be caused to prohibit the switching operation of the reproduction mode.

Therefore, according to the present invention, as the unnecessary component of 15 Hz in the tracking error signal is identified to control the mode decision circuit, the error discrimination is eliminated which may be caused because of errors to be caused in the head manufacturing process or in the head mounting process, thus resulting in greater effects.

Although the present invention has been fully described in connection with the preferred embodiments thereof with reference to the accompanying drawings, it is to be noted that various changes and modifications are apparent to those skilled in the art. By way of example, the pair of 15 Hz and 7.5 Hz detection circuits 14, 15 may be driven by a head changeover pulse RF in place of the clock pulses being generated from the clock pulse generator 20. Such changes and modifications are to be understood as included within the scope of the present invention as defined by the appended claims unless they depart therefrom.

What is claimed is:

1. In an 8 mm video including a tracking error signal circuit which outputs tracking error signals formed through comparison in the levels of particular beat components produced by the mixture of injection pilot signals and reproduction pilot signals to be obtained by a tape composed of the pilot signals for tracking use placed and recorded on the video track, and a record mode discrimination circuit which outputs a mode discrimination output for discriminating two modes of a standard record mode and a long time record mode twice as much upon counting the variation period of the tracking error signals, thereby to render to control the rotational phase of a capstan motor so as to switch the rotation speed of the capstan motor in accordance with the output of said record mode discrimination circuit, the record mode discrimination circuit comprising:

a sample hold circuit or sample holding the tracking error signals at a field period, a comparator circuit for changing a threshold level of a reference input in accordance with a comparator output to input the sample hold output into the comparator input, a duty identification circuit for identifying the duty cycle of said comparator output, a mode discrimination output generating circuit for transmitting the mode discriminating output in accordance with the comparator output, and a switching circuit for switching the duty identification circuit output in a manner that, upon identifying the duty cycle within the duty identification circuit, if the duty cycle is approximately 50, the comparator output is adapted to transmit into the mode discrimination output generating circuit, but, if the duty cycle is out of approximate 50, the comparator output is cut off not to transmit into the mode discrimination output generating circuit.

2. In an 8 mm video including a tracking error signal circuit which outputs tracking error signals formed through comparison in the levels of particular beat components produced by the mixture of injection pilot signals and reproduction pilot signals to be obtained by a tape composed of the pilot signals for tracking use placed and recorded on the video track, and a record mode discrimination circuit which outputs a mode discrimination output for discriminating two modes of a standard record mode and a long time record mode twice as much upon counting the variation period of the tracking error signals, thereby to render to control the rotational phase of a capstan motor so as to switch the rotation speed of the capstan motor in accordance with the output of said record mode discrimination circuit, the record mode discrimination circuit comprising:

a sample hold circuit for sample holding the tracking error signals at a field period, a comparator circuit for changing a threshold level of a reference input in accordance with a comparator output to input the sample hold output into the comparator input, a duty identification circuit for identifying the duty cycle of said comparator output, a period identification circuit for identifying the period of said comparator output, a mode discrimination output generating circuit for transmitting the mode discriminating output in accordance with the period identification circuit output, and a switching circuit for switching the duty identification circuit output in a manner that, upon identifying the duty cycle within the duty identification circuit, if the duty cycle is approximately 50, the comparator output is transmitted into the period identification circuit, but, if the duty cycle is out of approximate 50, the comparator output is cut off not to transmit into the period identification circuit.

3. In an 8 mm video including a tracking error signal circuit which outputs tracking error signals formed through comparison in the levels of particular beat components produced by the mixture of injection pilot signals and reproduction pilot signals to be obtained by a tape composed of the pilot signals for tracking use placed and recorded on the video track, and a record mode discrimination circuit which outputs a mode discrimination output for discriminating two modes of a standard record mode and a long time record mode twice as much upon counting the variation period of the tracking error signals, thereby to render to control the rotational phase of a capstan motor so as to switch the rotation speed of the capstan motor in accordance with the output of said record mode discrimination circuit, the record mode discrimination circuit comprising:

a sample hold circuit for sample holding the tracking error signals at a field period, a comparator circuit for changing a threshold level of a reference input in accordance with a comparator output to input the sample hold output into the comparator input, a duty identification circuit for identifying the duty cycle of said comparator output, a period identification circuit for identifying the period of said comparator output, a mode discrimination output generating circuit for transmitting the mode discriminating output in accordance with the period identification circuit output, and a switching circuit for switching the duty identification circuit output in a manner that, upon identifying the duty cycle within the duty identification circuit, if the duty cycle is approximately 50, the period identification circuit output is transmitted into the mode discrimination output generating circuit, but, if the duty cycle is out of approximate 50, the period identification circuit output is cut off not to transmit into the mode discrimination output generating circuit.

* * * * *